W. P. MAXWELL.
DRAFT APPLIANCE FOR VEHICLES.
APPLICATION FILED MAY 14, 1910.
969,645.
Patented Sept. 6, 1910.
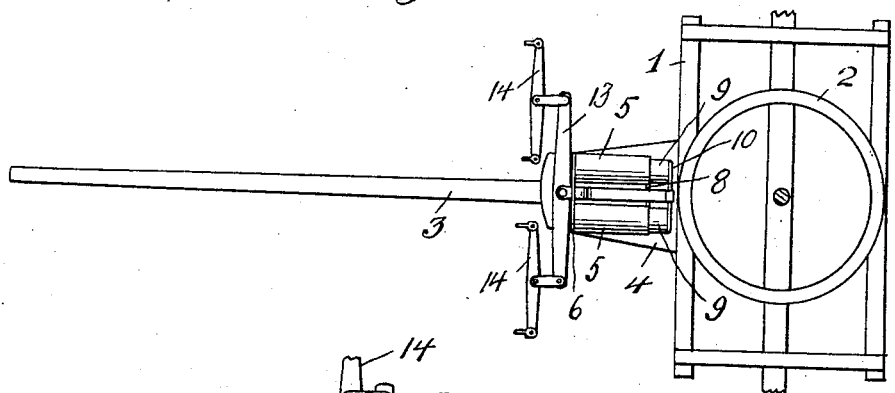
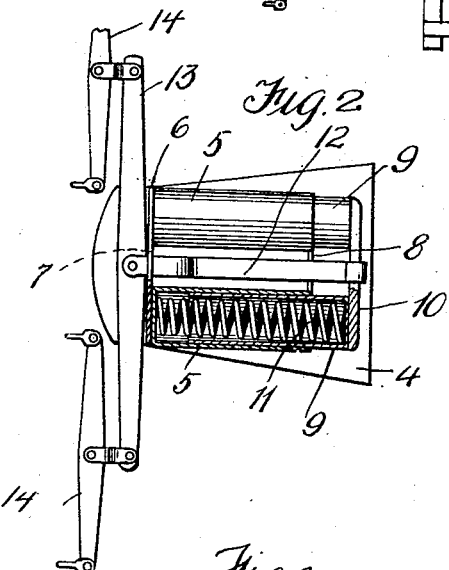
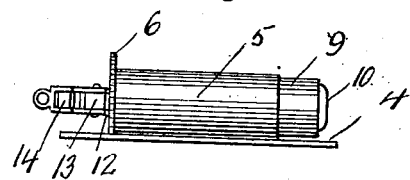
Witnesses:—
Inventor
W. P. MAXWELL,
by Attorneys.

UNITED STATES PATENT OFFICE.

WILLIAM P. MAXWELL, OF UNITY, PENNSYLVANIA.

DRAFT APPLIANCE FOR VEHICLES.

969,645.  Specification of Letters Patent.  Patented Sept. 6, 1910.

Application filed May 14, 1910. Serial No. 561,325.

*To all whom it may concern:*

Be it known that I, WILLIAM P. MAXWELL, a citizen of the United States of America, residing at Unity, in the county of Allegheny and State of Pennsylvania, have invented certain new and useful Improvements in Draft Appliances for Vehicles, of which the following is a specification, reference being had therein to the accompanying drawing.

This invention relates to draft appliances for vehicles, and the object of my invention is to provide a vehicle with reliable means for yieldably connecting a team of horses to the vehicle, whereby the team will receive sufficient impetus or encouragement to start off with a heavy load that otherwise probably could not be moved by the team.

Another object of this invention is to provide a vehicle with a novel draft appliance that will equalize the pull of the horses of a team and allow the animals to work in unison before the load is actually moved.

A further object of this invention is to accomplish the above results by an appliance that is simple in construction, durable, applicable to various types of vehicles and highly efficient for the purposes for which it is used.

The above objects are attained by a mechanical construction that will be hereinafter specifically described and then claimed, and reference will now be had to the drawing forming a part of this specification, wherein there is illustrated what is believed to be a practical embodiment of the invention.

In the drawings:—Figure 1 is a plan of the draft appliance as applied to the tongue of a vehicle. Fig. 2 is an enlarged plan of a detached appliance, partly broken away and partly in section, and Fig. 3 is a side elevation of the same.

The application of my draft appliance to a vehicle is shown in Fig. 1, where, by the way of an example, the reference numeral 1 denotes the forward running gear of a vehicle supporting a fifth wheel 2 and a tongue 3. Attached to the tongue 3 is a plate 4 and mounted upon said plate are two longitudinal parallel cylinders 5 having the forward ends thereof connected by a cross-head 6, which is provided with a central opening 7. The rear ends of the cylinders 5 are connected by a strap 8 and slidably mounted in said cylinders are cylindrical spring housings 9 having the outer ends thereof connected by a cross-head 10. In the housings 9 are arranged compression coiled springs 11, the forward ends of said springs engaging the forward ends of cylinders 5, while the rear ends of the springs engage the rear ends of the housings 9.

Connected to the cross-head 10 intermediate the ends thereof is a strap 12 extending forwardly between the cylinders 5, through the opening 7 of the cross-head 6 and pivotally connecting with a double-tree 13, which has the ends thereof provided with swingle-trees 14.

It is apparent that when a team of horses are attached to the swingle-trees 14 that the spring 11 will be compressed and placed under tension prior to a movement of the vehicle, consequently the horses will obtain a start that will allow them to work in unison before the load is actually moved, and it is through the medium of the springs 11 that the animals are encouraged to move a load and the animals relieved of the jarring and vibrating of a heavy load passing over a rough street or road.

Having now described my invention, what I claim as new is:—

In a draft appliance for vehicles, a plate supported at the forward portion of the running gear of the vehicle, a pair of cylinders, a cross head connecting the outer ends of the cylinders together and provided with a centrally disposed opening, a strap connecting the rear ends of the cylinders together, a pair of housings extending in said cylinders, springs carried by the housings and engaging the forward ends of the cylinders and the rear ends of said housings, a cross head connecting the housings together, and a longitudinally-extending member connected at its rear end to the cross head connecting the housings and projecting over said strap and extending through said opening adapted to be pivotally connected to a double tree.

In testimony whereof I affix my signature in the presence of two witnesses.

WILLIAM P. MAXWELL.

Witnesses:
 JOHN DANIELS,
 CYRUS H. THUNELL.